United States Patent [19]

Kosinsky

[11] 4,213,869

[45] Jul. 22, 1980

[54] MINIMAL BLOCKING THERMOPLASTIC MATERIAL AND LUBRICATING OIL COMPOSITION CONTAINING THE SAME

[75] Inventor: Edward J. Kosinsky, Bartlesville, Okla.

[73] Assignee: Phillips Petroleum Company, Bartlesville, Okla.

[21] Appl. No.: 29,419

[22] Filed: Apr. 12, 1979

[51] Int. Cl.² ............................................. C10M 1/24
[52] U.S. Cl. ............................... 252/37.5; 252/39; 252/41; 252/49.6
[58] Field of Search ............... 252/37.5, 39, 41, 49.6

[56] References Cited

U.S. PATENT DOCUMENTS

| | | | |
|---|---|---|---|
| 2,189,873 | 2/1940 | Zimmer et al. | 252/37.5 X |
| 2,654,710 | 10/1953 | Hotten | 252/37.5 X |
| 2,661,335 | 12/1953 | Butler | 252/39 X |
| 3,088,912 | 5/1963 | Morway et al. | 252/49.6 X |
| 3,384,586 | 5/1968 | McMillen | 252/39 X |
| 3,640,828 | 2/1972 | Brotz et al. | 252/39 X |
| 3,766,114 | 10/1973 | Walker et al. | 260/28.5 R |
| 3,803,065 | 4/1974 | Arai et al. | 260/23 H |
| 3,976,611 | 8/1976 | Aloia | 526/332 X |
| 4,029,682 | 6/1977 | Foulks, Jr. | 252/39 X |

*Primary Examiner*—Andrew Metz

[57] ABSTRACT

A normally solid thermoplastic material having a low softening point containing at least one metal salt of a metal selected from the group consisting of a metal of Group I, II, III or IV of the Periodic Table and a fatty acid having about 8 to about 30 carbon atoms per molecule and a silicone compound incorporated into or onto the thermoplastic material, the metal salt and the silicone compound being present in amounts sufficient to significantly reduce blocking between contact surfaces of the thermoplastic material and a lubricating composition containing the thermoplastic material.

7 Claims, No Drawings

MINIMAL BLOCKING THERMOPLASTIC MATERIAL AND LUBRICATING OIL COMPOSITION CONTAINING THE SAME

BACKGROUND OF THE INVENTION

1. Field of the Invention

The present invention relates to thermoplastic materials having incorporated into or onto such thermoplastic materials a novel antiblocking material and to novel lubricating oil compositions containing such thermoplastic materials.

2. Description of the Prior Art

It is known that certain thermoplastic materials, particularly those having low softening points, often exhibit blocking tendencies or the tendency of the contact points or surfaces of such materials to stick or adhere together during further processing, transport, storage, use etc. For example, thermoplastic materials, in divided form such as pellets, chips, crumbs, etc., are often further processed to incorporate therein solid filler materials, such as carbon black, coloring agents or the like. To the extent that the thermoplastic materials tend to form into lumps or a single solid mass it becomes difficult, time consuming and expensive to evenly disperse the solid material throughout the thermoplastic material. Further, certain polymers are supplied to the end user in the form of films, sheets, slabs, rolls, pellets or powder and, to the extent that thermoplastic material has a relatively low softening point, blocking occurs during shipment and storage. The extent of such blocking will depend upon the particular physical properties of the polymer itself as well as its form. Such variables as temperature, pressure and humidity can also alter the degree to which the polymer exhibits the tendency to block. An increase in any of these variables will generally increase the degree to which the polymer exhibits the tendency to block. Blocking of polymeric materials, especially during storage at ambient temperatures or above ambient temperatures, is therefore a serious problem in the industry.

It is often the desire of commercial users of thermoplastic materials to have these materials available in powder form, i.e. very small particles. Powder-form polymers are particularly desirable to commercial users whose process involves dissolving the polymer in a suitable solvent prior to the polymer's introduction into the manufacturers production process, since the time required to dissolve the polymer is typically directly proportional to the particle size. The cost of grinding equipment and the time required to convert the polymer to powder form is often prohibitive for the commercial user. Furthermore storage space requirements for the producer and user are often reduced if the polymer is in powder form, and shipping costs are similarly reduced compared to the polymer being in a form having a lower bulk density. As desirable as it might be to have powder-form thermoplastic materials available, as previously indicated, the blocking tendency of thermoplastic materials in this form is even more serious than in other forms.

It is also known in the art that the viscosity of lubricating oils, particularly mineral lubricating oils, varies with the temperature. Accordingly, it is usually necessary to add to the lubricating oil a material to increase the viscosity index of the oil. The higher the viscosity index the less the change in viscosity with change in temperature. The viscosity at 210° F. (99° C.) and at 100° F. (38° C.) is used to determine the viscosity index. It has been previously suggested that certain linear and block copolymers when added to lubricating oils in very small amounts are excellent viscosity index improvers. For this use it is desirable that the thermoplastic material be supplied in powder form, thereby facilitating incorporation of the thermoplastic material in the oil. To the extent that the viscosity index improving polymer has a tendency to block during transportation and storage serious problems are encountered since it is necessary to reconvert the polymer to powder form. Grinding equipment is often not possessed by the small lubricating oil compounder and the time required to convert the polymer to powder form is often prohibitive for the commercial user. Consequently, it is highly desirable that such polymeric viscosity index improvers be available in nonblocking powder form.

Various antiblocking agents, i.e. substances that reduce blocking when incorporated into the polymer are applied to the surface of the polymer have been previously employed.

Compounds such as sodium stearate, polyethylene, sodium dioctyl sulfosuccinate, alkyl amines, hydrocarbon esters of phosphoric acid, and alkyl quaternary ammonium compounds have heretofore been employed in particular polymers and are usually incorporated into the polymer before extruding, molding or casting, etc. It is known that specific antiblocking agents can usually be employed only with particular polymers or types of polymers as these substances may not be compatible with the polymer or may adversely affect other desired properties thereof.

Other compounds such as talc, silica, clay, starches, microcrystalline waxes and long-chain alkyl quaternary ammonium compounds have also been employed by applying these materials to the surface of the polymer either during or after extrusion, molding, or casting in order to reduce blocking.

SUMMARY OF THE INVENTION

It is therefore an object of the present invention to provide normally solid thermoplastic materials having a reduced tendency to block during further processing, transportation, storage or use. Another object of the present invention is to provide normally solid thermoplastic materials in powder form having a reduced tendency to block. A further object of the present invention is to provide a specific group of linear block copolymers in powder form having a reduced tendency to block. Another and further object of the present invention is to provide an improved lubricating oil composition containing certain linear and block copolymers in amounts sufficient to improve the viscosity index thereof and which copolymers have a reduced tendency to block in powder form. These and other objects and advantages of the present invention will be apparent from the following description.

It has been discovered in accordance with the present invention that thermoplastic materials, particularly linear block copolymers in powder form, having minimal blocking tendencies, can be provided by incorporating into or onto the polymeric material a metal salt of a fatty acid and a silicone compound. More specifically, it has been found that the combination of a fatty acid salt and a silicone compound is considerably more effective as an antiblocking agent than would be predicted from the antiblocking effectiveness of either the fatty acid salt or the silicone compound when used alone.

DETAILED DESCRIPTION OF THE INVENTION

The novel antiblocking agent of the present invention can be utilized to reduce the blocking tendencies of any thermoplastic material having a low softening point, for example polyolefin resins, acrylate elastomers and other polymeric materials having softening points below about 210° F. (98° C.) and particularly below about 120° F. (49° C.). However, the antiblocking agents of the present invention are particularly useful when incorporated into or onto certain linear block copolymers, particularly in powder form.

The copolymers suitable for use in accordance with the later aspect of the invention can be generally described as hydrogenated or nonhydrogenated random and block copolymers of conjugated dienes and monovinylarenes, and hydroxyl, carboxyl, mercapto, and amino-containing derivatives thereof. Optionally the copolymer may also contain other copolymerizable monomers, such as acrylonitrile, alkyl esters of acrylic and methacrylic acid, vinyl acetate, ε-caprolactone, diallyl maleate, diallyl phthalate, acrylic and methacrylic acid, and the like and mixtures thereof. The term block copolymer is meant to include those polymers containing at least two pure homopolymer block segments as well as those polymers containing at least two random or tapered block segments, and mixtures thereof, said copolymers generally having a conjugated diene/monovinylarene weight ratio of 5/95 to 95/5, preferably having a ratio of 35/65 to 90/10. These copolymers may be prepared by any method known in the art, such as by emulsion or solution polymerization. The copolymers can be prepared by a sequential addition process, a coupling process, or by a single charge process, and polymerization initiation can be by a mono- or multichelic initiator. Presently preferred are the hydrocarbyl alkali metal initiated, solution polymerization methods and resulting polymers which are described, for example in U.S. Pat. Nos. 2,975,160, 3,078,254, 3,281,383, 3,449,306, and 3,554,911. These copolymers can be prepared in a batch process, in a continuous process, or in combinations thereof.

Suitable conjugated diene monomers for the preparation of the copolymers of this invention are those containing from about 4 to about 12 carbon atoms per molecule. Examples of such monomers are 1,3-butadiene, isoprene, 2,3-dimethyl-1,3-butadiene, piperylene, 3-butyl-1,3-octadiene, 2-phenyl-1,3-butadiene, and the like, and mixtures thereof. Especially preferred is 1,3-butadiene due to its availability and favorable cost.

The monovinylarene monomers suitable for the preparation of the copolymers of this invention normally contain from about 8 to about 20 carbon atoms per molecule and can contain alkyl, cycloalkyl, and aryl substituents, and combinations thereof such as alkylaryl, in which the total number of carbon atoms in the combined substituents is generally not greater than 12. Examples of suitable monovinylarene monomers include styrene, α-methylstyrene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, 1-vinylnaphthalene, 2-vinylnaphthalene, and the like. Styrene is presently preferred due to its availability and effectiveness.

Suitable inert solvents for use in solution polymerization of the copolymers of this invention include paraffinic, cycloparaffinic, and aromatic hydrocarbons, and mixtures thereof. Examples of such solvents include n-pentane, n-hexane, n-heptane, 2,2,4-trimethylpentane, cyclohexane, benzene, toluene, xylene, and the like. Optionally, a mixture of an inert hydrocarbon solvent, as described above, and a polar solvent may be employed if it is desired to enhance the formation of a particular polymer structure, i.e. high vinyl content or formation of random copolymer, or to improve the efficiency of the polymerization process. Such a polar solvent preferably should not interact in an adverse manner with the initiator, monomers, coupling agents if employed, or other ingredients of the polymerization recipe. Polar solvents which may be used include such as cyclic and acyclic ethers, thioethers, tertiary amines, and other such polar solvents used for this purpose as disclosed in the art.

Suitable initiators for solution polymerized copolymers of this invention are the organolithium compounds of the general formula $RLi_x$, wherein R is a hydrocarbyl radical selected from the group consisting of aliphatic, cycloaliphatic, and aromatic radicals, and combinations thereof, and x is an integer of 1 to 10, inclusive, more preferably 1 to 4. The R in the formula has a valence equal to the integer x and generally contains 1 to 20, inclusive, carbon atoms, although higher molecular weight compounds can be utilized. n-Butyllithium is an example of an especially suitable polymerization initiator due to its ready availability.

Other suitable organolithium initiation agents are the alphalithio multisubstituted dialkylbenzenes and corresponding oligomers. Although these initiators normally consist of a mixture of various oligomers, the mixture is primarily 1,3-bis(1-lithio-3-methylpentyl)benzene, and this initiator is typically referred to as DiLi-3. Additional information regarding such compounds can be found in U.S. Pat. No. 3,668,283, Morrison et al (1972) and U.S. Pat. No. 3,776,964, Morrison et al (1973).

The amount of organolithium initiator to be used depends on the desired molecular weight of the polymer, but is normally in the range of about 0.1 to 100 milliequivalents of lithium per 100 grams of total monomer.

The analogous sodium and potassium compounds are also suitable for the preparation of the copolymers of this invention.

Polymerization conditions generally known to one skilled in the art can suitably be employed. The polymerization temperature can vary over a board range and is generally about −50° to about 200° C. It is preferrable to operate within a temperature range of about 50° to about 150° C.

The copolymers suitable for use in accordance with this aspect of the invention generally have a number average molecular weight of about 5,000 to 1,500,000, more preferably from about 40,000 to about 250,000.

The fatty acid salts suitable for use in the minimal blocking composition of this invention are typically high melting solids and include the Group I, II, III, or IV metal salts of those fatty acids having from about 8 to about 30, more preferably from about 12 to about 18 carbon atoms per molecule. Examples of suitable fatty acid salts include, but are not limited to, the aluminum, calcium, lead, magnesium, sodium, and zinc salts of lauric, myristic, palmitic, and stearic acids. The amount of fatty acid salt used in the composition of this invention can range broadly from about 0.01 to about 2.0, preferably from about 0.05 to about 0.25, parts by weight per 100 parts by weight of conjugated diene-monovinylarene copolymer (phr). The upper limit which can be used is often dictated by practical and end-use requirements for the composition. For example, a minimal amount, such as less than 0.10 phr, might be dictated due to solubility limitations of the fatty acid salt in a solution of the invention composition in a solvent such as a hyrocarbon oil, or due to potential oxidative instability of the fatty acid salt at the end-use temperatures of the final product which contains the invention composition, said oxidative degradation products often being detrimental to the physical properties of the final end-use product. These limitations are particularly critical for end-uses wherein the minimal blocking composition of this invention is to be used as a viscosity index improver for motor oil. In such applications, the composition of this invention desirably will contain only a minimal amount of the anti-blocking agents which are comprised in the composition of this invention, and which are necessary to minimize or eliminate blocking of the powder-form butadiene-styrene copolymer during shipment and storage.

The silicone compounds suitable for use in the composition of this invention are generally described as hydroxy end-blocked dihydrocarbyl silicone fluids, and more specifically as polydihydrocarbylsiloxanes. These silicone compounds are typically available as water dilutable concentrated emulsions having 25 to 75 weight percent solids. The dihydrocarbyl substituents can include alkyl, cycloalkyl, and aryl groups, and combinations thereof, having up to about 12 carbon atoms per hydrocarbyl substituent. Presently preferred is polydimethylsiloxane due to its availability.

The level of the polydihydrocarbylsiloxane which can be used in the composition of this invention ranges from about 0.02 to about 1.0 parts by weight per 100 parts by weight of butadiene-styrene copolymer. As with the fatty acid salts, the upper limit is often controlled by practical limitations. In the case wherein the butadiene-styrene copolymer of the invention composition is to be used as a viscosity index improver for motor oil, an upper limit might be determined wherein a higher level of the polydihydrocarbylsiloxane results in a hazy motor oil.

The weight ratio of polydihydrocarbylsiloxane:fatty acid salt which is suitable for use in the invention composition ranges from about 1:30 to about 30:1, more preferably from about 1:3 to about 6:1.

The fatty acid salt and the silicone compound can be added to the conjugated diene-monovinylarene copolymer either separately or together. The silicone compound, which is typically available as a concentrated emulsion, is normally diluted with water prior to addition to the conjugated diene-monovinylarene copolymer, and the fatty acid salt can, if desired, be dispersed in this diluted silicone emulsion. The antiblocking components can be added to polymer crumb, to ground crumb, to densified crumb, or to ground and densified crumb. The fatty acid and silicone can be added prior to, during, or after the grinding or densifying steps. Preferably the ingredients are added before the final size reduction step to insure uniform mixing of the antiblocking components with the conjugated diene-monovinylarene copolymer, as well as to dry the final composition prior to packaging. Sufficient heat is generally generated during the final size reduction step to drive off the water added to the polymer via the silicone emulsion. Alternately an optional drying step by any means known in the art may be used to dry the composition prior to packaging.

The antiblocking components can be added to the butadiene-styrene copolymer incrementally, or can be added continuously, such as for example, spraying of a solution or emulsion of one or more of the additives as a fine mist onto the polymer.

The novel lubricating oil compositions of the present invention are prepared by simply dissolving the powder-form thermoplastic composition in the oil. In the preparation of the lubricating compositions varying mineral oils are employed. Generally these are of petroleum origin and are complex mixtures of many hydrocarbon compounds. Preferably the mineral oils are refined products such as are obtained by well known refining processes, such as hydrogenation, polymerization, dewaxing, etc. Frequently the oils have a Saybolt viscosity at 100° F. (38° C.) in the range of about 60 to 5000 and a Saybolt viscosity at 210° F. (99° C.) of about 30 to 250. The oils can be of paraffinic, naphthenic or aromatic types as well as mixtures of one or more of these types. However, the additives of the invention have special advantage when employed with paraffinic type oils such as are obtained by solvent extraction of a suitable refinery stream. Many suitable lubricating compositions are available as commercial products, such as those used for motor oils, gear oils, automatic transmission oils and the like. In addition to the viscosity improving additives of this invention, lubricating compositions can comprise one or more other additives known to those skilled in the art, such as antioxidants, pour point depressants, dyes, detergents, etc. Examples of these additives are metal petroleum sulfonates, zinc dialkyldithiophosphates and alkyl succinic amines. To be of commercial interest as a motor oil, the lubricating composition should have a viscosity index of at least about 140.

The viscosity index improving additives of the present invention are usually employed in the lubricating oil composition in an amount in the approximate range of about 0.5 to about 5 percent by volume of the lubricating oil. One skilled in the art can routinely determine the optimum proportion of viscosity index improver for this purpose.

The following examples illustrate the advantages of the present invention. It is to be understood that these examples are illustrative only and are not to be considered in any way limiting.

EXAMPLE I

This example illustrates the effectiveness of a combination of calcium stearate and a polydimethylsiloxane in providing minimal blocking characteristics to a powder-form butadiene-styrene copolymer.

A 41/59 butadiene/styrene hydrogenated block copolymer having a block polystyrene content of about 20 weight percent and a number average molecular weight of about 58,000 was packaged in the form of as prepared dry crumb in boxes which measured about 32.5 inches (82.6 cm) by about 32.5 inches (82.6 cm) by about 40.5 inches (102.9 cm) and which held about 250 pounds (113.4 kg) of the copolymer. Shipment and storage of these boxes at temperatures below 25° C. resulted in the dry crumb blocking so severely that the large blocked lumps could not be broken apart manually.

To determine whether polymer in smaller particle size than the dry crumb would likewise block, a first portion of dry crumb was ground using an 18-inch (45.7 cm) diameter Wedco Utility Mill, a second portion was densified using a 14-inch (35.6 cm) diameter by 36-inch (91.4 cm) long Wedco Polisher, and a third portion was subjected to both treatments, first being ground in the Wedco Utility Mill and then being densified (further reduced in particle size to increase bulk density) in the Wedco Polisher. To test the effectiveness of a silicone compound as an antiblocking agent, three levels of Dow Corning 36 Emulsion (a polydimethylsiloxane 120° F. (49° C.), and then the force determined which was required to crumble the blocked sample. Results of the simulated blocking tests are shown in Table I.

These data illustrate that under the simulated test conditions previously described, ground and/or densified copolymer without added antiblocking agents, or with only one antiblocking agent blocks unacceptedly. Addition of about 0.05 to 0.16 phr polydimethylsiloxane in combination with 0.05 to 0.10 phr calcium stearate unexpectedly gave a copolymer composition which was considered to have acceptable antiblocking characteristics.

TABLE I

Blocking of Ground and Densified Copolymer With and Without Added Polydimethylsiloxane (DC-36 Emulsion) and Calcium Stearate

| Run No. | Copolymer Form | | Point of Poly-dimethylsiloxane Addition | Polydimethyl-siloxane,[a] phr | Calcium Stearate,[b] phr | Crush Strength, pounds[c] |
|---|---|---|---|---|---|---|
| | Ground | Densified | | | | |
| 1 | Yes | No | None | 0 | 0 | >120 |
| 2 | No | Yes | None | 0 | 0 | >120 |
| 3 | Yes | Yes | None | 0 | 0 | >120 |
| 4 | No | Yes | d | 0.0525 | 0 | >120 |
| 5 | Yes | Yes | d | 0.0525 | 0 | >120 |
| 6 | Yes | No | e | 0.1050 | 0 | >120 |
| 7 | No | Yes | d | 0.1050 | 0 | >120 |
| 8 | No | Yes | f | 0.1050 | 0 | >120 |
| 9 | Yes | Yes | d | 0.1050 | 0 | >120 |
| 10 | Yes | Yes | e | 0.1050 | 0 | 116 |
| 11 | No | Yes | d | 0.1575 | 0 | >120 |
| 12 | Yes | Yes | d | 0.1575 | 0 | >120 |
| 13 | Yes | Yes | None | 0 | 0.05 | >120 |
| 14 | Yes | Yes | d | 0.0525 | 0.025 | 42 |
| 15 | Yes | Yes | d | 0.0525 | 0.05 | 24 |
| 16 | yes | Yes | d | 0.0525 | 0.05 | 8–9 |
| 17 | Yes | Yes | d | 0.0525 | 0.10 | 15 |
| 18 | Yes | Yes | d | 0.1575 | 0.10 | 5 |

[a]DC-36 emulsion (35 weight percent solids) diluted with water and added incrementally to the polymer as a 5 weight percent emulsion.
[b]Added to the polymer following the densification step, and after addition of the silicone emulsion in those samples containing both antiblocking agents.
[c]A clump of blocked polymer is placed on a platform scale, downward hand pressure applied to the polymer clump, and the scale reading noted at which the clump crumbles. A value of 20 pounds or less is judged necessary for the composition to be considered minimal blocking.
[d]Added to densified polymer.
[e]Added to dry crumb before grinding step.
[f]Added to dry crumb before densification step.

aqueous emulsion having a silicone content of 35 weight percent) were added to ground and/or densified copolymer. The silicone emulsion was diluted to a 5 weight percent solution prior to its addition to the copolymer to enhance uniformity of distribution in the final product. The diluted silicone emulsion was either preblended with the dry crumb prior to grinding and/or densifying, or was blended with the copolymer after the densification step. The diluted silicone emulsion was added incrementally to the copolymer. To test the effectiveness of calcium stearate as an antiblocking agent, ground and densified copolymer was blended with a single level of calcium stearate, and to evaluate the effectiveness of a combination of a silicone compound and calcium stearate, three levels of calcium stearate were added to ground and densified copolymer to which the silicone emulsion had been added after the densification step.

This series of ground and/or densified copolymer samples with and without added silicone emulsion and/or calcium stearate was evaluated for blocking tendencies by subjecting each sample to a test simulating summertime storage and shipment conditions. This simulated test involved charging 200 g of polymer sample to a 3-inch (7.62 cm) diameter plastic cylinder and placing a 4.15 pound (1.88 kg) weight on top of the sample to simulate bags-on-bags or box storage and shipment conditions. The loaded sample was stored for 90 hours at A second series of samples was prepared and evaluated by a slightly different simulated storage test. In this test, 600 g. of the copolymer was placed in the same 3-inch (7.62 cm) diameter plastic cylinder described previously. No additional weight was placed on the top of the polymer, the approximately 12 inch (30.5 cm) high column of copolymer simulating storage of polymer in a box 12 inches deep. The length of time and the temperature of the test was the same as described previously. Evaluation involved, in addition to crush strength, determination of the weight percent of the copolymer composition which would pour freely from the plastic cylinder after the test period. If none of the copolymer composition would pour freely, the cylinder was returned to its upright position and tapped several times by lightly striking the cylinder simultaneously with the extended fingers of both hands, and then re-checked for percent free flow. Results of this test are tabulated in Table II.

These data illustrate that a combination of about 0.05 to 0.11 phr polydimethysiloxane and about 0.05 to 0.10 phr calcium stearate provides antiblocking characteristics to powder-form butadiene-styrene copolymer that cannot be achieved using up to 0.11 phr of polydimethylsiloxane alone or up to 0.5 phr of calcium stearate alone. The use of 1.0 phr of calcium stearate, while providing antiblocking characteristics to powder-form copolymer, is too high a level for many applications of the copolymer, such as for example, use of the butadiene-styrene copolymer as a viscosity index improver for motor oil.

A fifty pound sample of powder-form copolymer containing 0.09 phr polydimethylsiloxane and 0.05 phr calcium stearate (Run No. 38) was packaged in a box measuring 13.5 inches wide by 27 inches long by 12.5 inches high and stored for 132 hours at a temperature

TABLE II

Blocking of Densified Copolymer With Added Polydimethylsiloxane (DC-36 Emulsion) and/or Calcium Stearate

| Run No. | Copolymer Form Ground | Copolymer Form Densified | Point of Polydimethylsiloxane Addition | Polydimethylsiloxane, phr$^a$ | Calcium Stearate,$^b$ phr | % Free Flow$^c$ Before Tapping Container | % Free Flow$^c$ After Tapping Container | Crush Strength, Pounds |
|---|---|---|---|---|---|---|---|---|
| 19 | No  | Yes | $e$ | 0.0525 | 0 | 0 | 0 | 41–44 |
| 20 | Yes | Yes | $e$ | 0.0525 | 0 | 0 | 0 | 26–28 |
| 21 | No  | Yes | $f$ | 0.1050 | 0 | 0 | 0 | 29–31 |
| 22 | Yes | Yes | $g$ | 0.1050 | 0 | 0 | 0 | 11–14 |
| 23 | Yes | Yes | None | 0 | 0.05 | 0 | 14 | 5 |
| 24 | Yes | Yes | None | 0 | 0.25 | 2 | 13 | >2 |
| 25 | Yes | Yes | None | 0 | 0.25 | 11 | 13 | 2 |
| 26 | Yes | Yes | None | 0 | 0.50 | 2 | 32 | >2 |
| 27 | Yes | Yes | None | 0 | 0.50 | 31 | 33 | 1 |
| 28 | Yes | Yes | None | 0 | 1.00 | 31 | 100 | — |
| 29 | Yes | Yes | None | 0 | 1.00 | 61 | 100 | — |
| 30 | Yes | Yes | $e$ | 0.0525 | 0.025 | 2 | 2 | 6 |
| 31 | Yes | Yes | $e$ | 0.0525 | 0.05 | 26 | 100 | — |
| 32 | Yes | Yes | $e$ | 0.0525 | 0.10 | 14 | 100 | — |
| 33 | Yes | Yes | $g$ | 0.1050 | 0.10 | — | 100 | — |
| 34 | Yes | Yes | $g$ | 0.1050 | 1.00 | 100 | — | — |

$^a$See footnote a, Table I.
$^b$See footnote b, Table I.
$^c$100% Free flow before or after tapping container is judged to be necessary for the composition to be considered minimal blocking.
$^d$See footnote c, Table I.
$^e$See footnote d, Table I.
$^f$See footnote f, Table I.
$^g$See footnote e, Table I.

EXAMPLE II

This example illustrates the antiblocking properties which are provided to a powder form butadiene-styrene copolymer by a combination of calcium stearate and a silicone emulsion different from the one used in Example I.

The same hydrogenated butadiene-styrene copolymer as described in Example I was blended with calcium stearate and/or Dow Corning 347 Emulsion (a polydimethylsiloxane aqueous emulsion having a silicone content of 60 weight percent; molecular weight of the polydimethylsiloxane is about 5,500) and these compositions tested using the simulated tests described for the samples in Table II of Example I. Results of these tests are shown in Table III.

TABLE III

Blocking of Ground and Denified Copolymer with Added Polydimethysiloxane (DC-347 Emulsion) and/or Calcium stearate

| Run No. | Polydimethylsiloxane, phr$^a$ | Calcium Stearate, phr$^b$ | % Free Flow Before Tapping Container | % Free Flow After Tapping Container | Crush Strength, Pounds |
|---|---|---|---|---|---|
| 35 | 0.09 | 0     | $d$ | $d$ | $d$ |
| 36 | 0    | 0.05  | 0   | 14  | 5 |
| 37 | 0.09 | 0.05  | 0   | 56  | >1 |
| 38 | 0.09 | 0.05  | 0   | 100 | — |
| 39 | 0.09 | 0.05  | 0   | 100 | — |
| 40 | 0.09 | 0.075 | 0   | 100 | — |
| 41 | 0.09 | 0.10  | 23  | 100 | — |

$^a$DC-347 emulsion (60 weight percent solids) diluted with water and sprayed continuously as a fine mist onto the copolymer dry crumb prior to the grinding step.
$^b$Added to the powder-form polymer following the densification step.
$^c$100% Free flow before or after tapping containiner is judged to be necessary for the composition to be considered minimal blocking.
$^d$Blocked unacceptably during storage and shipment.

which ranged from 32° to 43° C. (90° to 110° F.). At the end of this test period, the composition poured freely from the box. Some clumps were observed in the bottom of the box, but they broke apart during the pouring operation.

These data illustrate that a combination of 0.09 phr polydimethysiloxane (added as a 5 weight percent solids emulsion of DC-347) and 0.05 phr calcium stearate effectively eliminates blocking during simulated storage conditions.

EXAMPLE III

This example illustrates that a motor oil containing the viscosity improving agent of the present invention exhibited properties equivalent to those of a lab blended and refinery blended commercial SAE 10W-40 motor oil when subjected to an Oldsmobile Sequence IIID oxidative thickening and engine wear test. The Sequence IIID test is a tentative-modified test procedure to replace the Sequence IIIC Test Method described in ASTM Special Technical Publication 315G, entitled "Multicycle Test Sequence for Evaluating Auto Engine Oils".

Dry copolymer crumb was treated with 0.15 percent Dow Corning 347 silicone emulsion prior to grinding and densification in a Wedco Utility Mill and Polisher. The densified product was then blended with 0.05 percent calcium stearate. The material generally ranged between 10 mesh and 70 mesh, as measured by a standard sieve. The densified product was then blended with a standard lubricating composition, in an amount of 2.1 volume percent. Table IV below sets forth the results of this test:

TABLE IV

|  | Present Invention | Lab-Blended | Refinery Blended |
|---|---|---|---|
| Viscosity Increase at 100° F. % - @ 40 hrs. | 177 | 141 | 163 |
| Viscosity Increase at 100° F. % - @ 64 hrs | 421 | 273 | 312 |
| Avg. Sludge (10 = Clean) | 9.7 | 9.5 | 9.6 |
| Avg. Piston Skirt Varnish (10 = Clean) | 9.1 | 8.9 | 9.3 |
| Avg. Oil Ring Land Varnish (10 = Clean) | 8.0 | 8.0 | 8.4 |
| Cam + Lifter Wear, in , avg. | 0.0011 | 0.0018 | 0.0014 |
| Cam + Lifter Wear, in , max. | 0.0020 | 0.0036 | 0.0026 |
| Oil Consumption, qt. | 5.60 | 6.00 | 6.12 |

As will be observed the oil containing the viscosity improving agent of the present invention exhibited a cleanliness and wear ratings essentially identical to those observed with both production and laboratory samples of a commercial motor oil. While there is an indication of a somewhat greater tendency toward thickening (64 hours) in the oil treated with the viscosity index improving agent of the present invention, it is doubtful that either the silicone compound or the calcium stearate present contributed measurably to the thickening since these materials are present in the finished motor oil in concentrations of 32 ppm and 11 ppm, respectively. It is more probable at the 64 hour viscosity increase observed between the lab blended commercial product and the product of the present invention represent the degree of variability (repeatability) to be expected for 64 hour viscosity increases in the test procedure. It should be noted that at 40 hours viscosity increases were both low and in a narrow band.

While specific examples, materials and procedures have been referred to herein for purposes of illustration, it is to be understood that these specifics are not to be considered limiting and the present invention is limited only in accordance with the appended claims.

What is claimed is:

1. A lubricating oil composition having a low viscosity index comprising a mineral lubricating oil containing from about 0.5 to about 5.0 percent by volume of conjugated diene-monovinylarene copolymer having incorporated into or onto said copolymer at least one metal salt of a metal selected from the group consisting of a metal of Group I, II, III or IV of the Periodic Table and a fatty acid having about 8 to about 30 carbon atoms per molecule and a polyhydrocarbylsiloxane silicone compound, the relative amounts of said metal salt and said silicone compound being sufficient to significantly reduce the blocking between contact surfaces of said conjugated diene-monovinylarene copolymer.

2. A lubricating oil composition in accordance with claim 1 wherein the copolymer is a copolymer selected from the group consisting of hydrogenated and nonhydrogenated random and block copolymers, hydroxyl, carboxyl, mercapto and amino-containing derivatives thereof and mixtures thereof.

3. A lubricating oil composition in accordance with claim 2 wherein the copolymer has a number average molecular weight between about 5000 and about 1,500,000.

4. A lubricating oil composition in accordance with claim 1 wherein the fatty acid has between about 12 and about 18 carbon atoms per molecule.

5. A lubricating oil composition in accordance with claim 1 wherein the silicone compound is a polydimethylsiloxane.

6. A lubricating oil composition in accordance with claim 1 wherein the metal salt is present in an amount between about 0.01 and about 2.0 parts by weight per 100 parts of copolymer and the silicone compound is present in an amount of about 0.02 to 1.0 parts per 100 parts of said copolymer.

7. A lubricating oil composition in accordance with claim 1 wherein the weight ratio of the silicone compound to the metal salt is between about 1:30 and 30:1.

* * * * *